Dec. 5, 1967   R. G. KNUDSEN ET AL   3,355,970
PRE-SET ADJUSTABLE TORQUE WRENCHES
Filed Feb. 23, 1966
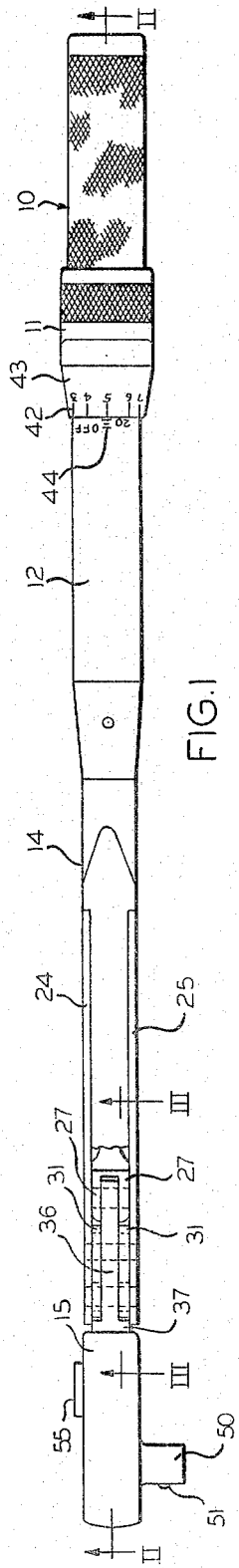
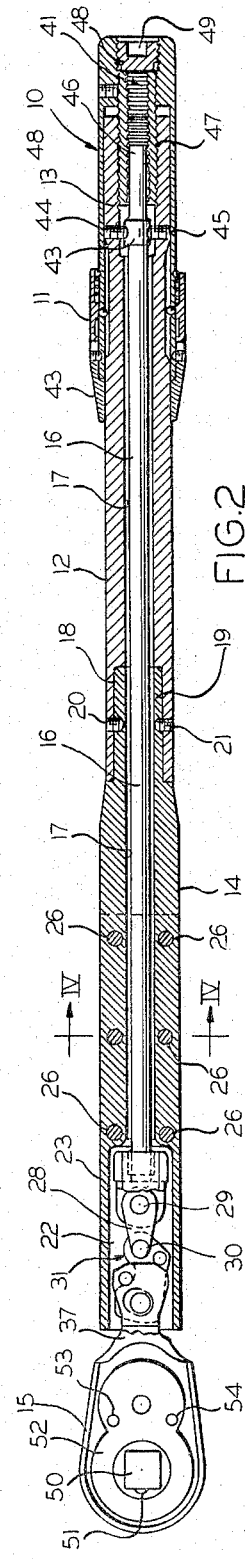
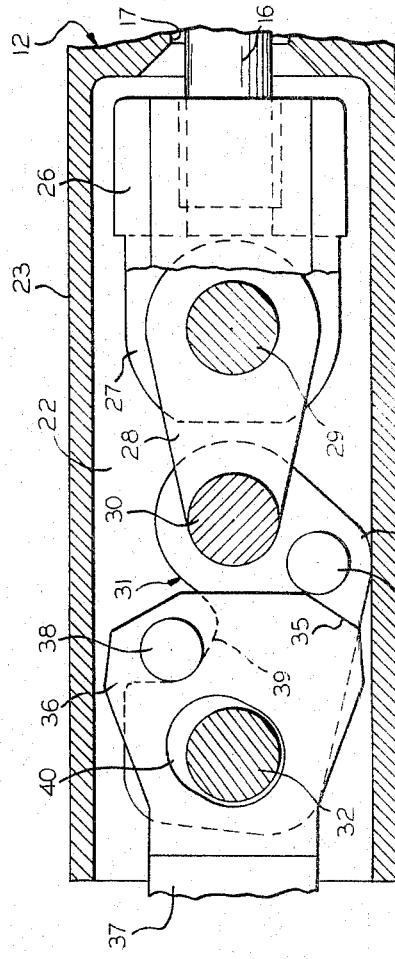
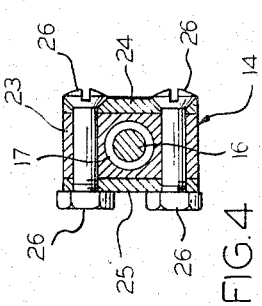
INVENTORS
RAYMOND G. KNUDSEN
GENE E. OLSON
BY Harry C. Alberts
ATTORNEY

United States Patent Office 3,355,970
Patented Dec. 5, 1967

3,355,970
PRE-SET ADJUSTABLE TORQUE WRENCHES
Raymond G. Knudsen and Gene E. Olson, Kenosha, Wis., assignors to Snap-On Tools Corporation, Kenosha, Wis., a corporation of Delaware
Filed Feb. 23, 1966, Ser. No. 529,557
10 Claims. (Cl. 81—52.4)

This invention relates to torque measuring wrenches and more particularly to pre-set adjustable torque measuring devices which are automatically rendered inoperative responsive to loading the measuring instrumentality to its pre-set load, although many of the features thereof may be employed with equal advantage for other purposes and in different combinations for the same purpose.

It contemplates more especially measuring instrumentalities of the type decsribed and claimed or intended to be described and claimed in our United States Letters Patent No. 3,236,127 dated Feb. 22, 1966, but with improved features of construction and operation to accomplish tightening functions therewith in a manner that will mechanically release to render turning impossible after the pre-set load has been attained.

With the teachings of the present invention, the requierment of relying upon a calibrated visual dial or other indicator is eliminated, and the error in varying human responsiveness upon attaining the predetermined turning load does not enter into the operation. Further, the constant concentration of the operator upon the load factor and the dial reading, slows up the operation. This is especially important in production lines where the same operation is repeated over daily periods so that automatic release of the load applying handle in assembly operations when the pre-set torque load has been attained will speed up the operations and eliminate variations due to judgment and reflex responses of individuals depending upon their degree of fatigue and differences between different individual operators or production personnel.

One object of the present invention is to simplify the construction and improve the operating characteristics of pre-set torque measuring wrenches and the like.

Another object is to provide an improved release mechanism for torque measuring wrenches and the like to render them more effective for production line operations.

Still another object is to provide improved means for mechanically setting and releasing measuring instrumentalities to render them inoperative upon reaching any predetermined load within the range of the devices.

A further object is to provide linkage in conjunction with camming expedients for adjustably predetermining the load at which the elements will disengage or release to preclude any further force to be applied in the tightening operation.

A still further object is to provide improved pre-setting and adjusting means for torque wrenches of the automatically releasable type so that tightening of fasteners in assembly line production operations can be accomplished faster and with greater economy of operations.

Still a further object is to provide an improved camming connector between the work engaging member and the load applying handle in torque measuring devices to accomplish mechanical disengagement at any pre-set load within the range of the instrumentalities.

Other objects and advantages will appear from the following description of an illustrated embodiment of the present invention.

In the drawing:
FIGURE 1 is a front view in elevation of a device embodying features of the present invention.
FIGURE 2 is a plan sectional view taken substantially along line II—II of FIGURE 1.
FIGURE 3 is an enlarged fragmentary plan sectional view taken substantially along line III—III of FIGURE 1 and illustrating the camming linkage connector and release mechanism.
FIGURE 4 is an enlarged sectional end view taken substantially along line IV—IV of FIGURE 3.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a handle member 10 which has a somewhat larger diameter sleeve or collar 11 journalled thereon for rotation relative thereto and an elongated shank 12 that extends into the handle member 10 at one end 13 while the other end thereof is complemental to and operatively connects with an elongated shank extension 14. The shank extension 14 has a suitable head member 15 in working engagement therewith in a manner to be described hereinafter.

The tubular handle member 10 with its sleeve or collar 11 are exteriorly knurled to enable their convenient rotation relative to each other and to the elongated shank 12 to provide a micrometer adjustment and control for a precision stretch or tensile measuring instrumentality such as a rod 16 which extends through the axial bore 17 provided through the handle shank 12 and the shank extension 14. The elongated shank 12 and its extensions 14 are interconnected by a complementally fitted recess 18 and projecting end bar 19 which have opposed set screws 20-21 extending between the adjacent walls of the handle shank 12 and its extension 14 intermediate the length of the interfitting recess 18 and end bar 19 to retain them in assembled relation.

The bore 17 in the shank extension 14, communicates with a chamber 22 provided in the free end 23 of the shank extension 14. The chamber 22 is rendered accessible by confronting recessed rectangular plates 24–25 which are attached to the body of the shank extension 14 by means of suitable fasteners 26. The elongated rod 16 within the axial shank bore 17, terminates in a knuckle fitting 26 (FIGURE 3) which is anchored thereto by welding or other suitable fastening expedients to provide spaced furcations 27 thereon for the pivotal connection of a short arm lever 28 having a pin 29 extending therethrough for mounting in the spaced furcations 27. The short arm lever 28, in turn, has its narrow end pivoted to a trunnion 30 which maintains spaced camming arm plates 31 of irregular configuration, in operative relation with a clearance stud 32 anchored between the camming arm plates 31 proximate to the forward end thereof.

The camming arm plates 31 have elbow-like heel portions 33 which abut against the interior of the chamber 22 to carry a stud 34 therebetween for guidance along the straight corner edge 35 of a shank plate 36 extending integrally from a work engaging head shank 37 that projects outwardly from the forward or free end of the open chamber 22. The shank plate 36 has another stud 38 anchored therebetween in spaced relation to the stud 34 for positioning in the path of an inwardly extending curved recess 39 provided in each of the camming arm plates 31 to serve as a cam follower therein, the pin 38 being in contact with the curved cam edges 39 for establishing a releasable camming connection in conjunction with the pin 34 with the shank plate 36 that has an angularly disposed slot 40 therein for accommodating the clearance pin 32 which assists in guiding the releasable connection with the plates 31 and limits the relative movement therebetween when the turning or toque load on the work head shank 37 exerts a stretching urge beyond the pre-set tensile elasticity of the retaining rod 16 which, in turn, will relieve the pull on the bell crank 31 through the linkage 28 and pins 29-30 to permit its counterclockwise pivotal movement (viewed from FIGURE 3). This will allow the pin 38 to ride out of the camming notch 39 to disrupt the load sustaining connection between the handle 12-16-28 linkage and the work head shank 37. This recurs and the torque wrench turning moment is interrupted when the applied torque load reaches the pre-set value to which the calibrated micrometer mechanism 41 is adjusted by means of the calibrations 42 inscribed circumferentially on the tapered end 42 (FIGURE 1) of the sleeve or collar 11 journalled and retained on the handle member 10 in a manner well known in the micrometer art.

The micrometer collar calibrations 42 confront linear measurement lines 44 divided in the customary manner on the elongated shank handle 12 so that micrometer adjustment of the collar or sleeve 11 rotarily will impart a precision accurate tension to the control rod 16. The rod 16 has, in this instance, a peripheral collar 43 thereon which cooperate with diametrically opposed set screws 44-45 extending through the handle end 13 to engage the collar 43 through which the elongated rod 16 is linearly displaceable to allow for the tensioning thereof. The elongated rod 16 has a threaded end region 46 which is complemental to an interiorly and exteriorly threaded sleeve 47 that threadedly engages the interiorly threaded bore 48 of the handle end 13. The handle member 10 as well as the collar or sleeve 11 are exteriorly knurled to enable the relative rotatable adjustment thereof to provide accurate micrometer pre-setting of the tension in the elongated axial rod 16.

In order to enable the desired compensatory adjustment in the micrometer 41, the interiorly and exteriorly threaded sleeve 47 is held relatively to the handle member 10 by means of an end plug 48 threaded into the end of the latter for a tight engagement therewith by resort to an appropriate wrench recess 49 which may be turned in a manner well known in the art. The micrometer 41 involves the handle member 10 and its sleeve 11 calibrated relative to the linear calibrations 44 on the elongated handle shank 12 to impart the desired adjustment to the tensioning of the elongated rod 16 prior to applying torque to a fastener such as a nut with an accurate torque load corresponding to the adjustment on the micrometer 41. The torque is applied to the handle shank 14-24 and its head member 15, and this torque load is transmitted to a nut turning socket (not shown) which is telescopically fitted onto the work shank 50 and retained in the usual manner with the aid of a spring impelled ball detent 51.

The work shank 50 is journalled in a casing cover plate and also in a recess bearing provided interiorly of the head member 15 which serves as a chambered casing for ratchet mechanisms confined therein and consisting of suitable ratchet wheel and pawls which are of standard design and construction. The chambered casing is closed by the plate 52 either press-fitted therein or held by means of threaded fasteners 53-54. The opposite wall of the chambered casing 15 is provided with a lever 55 (FIGURE 1) that is operatively connected to the directional ratcheting pawl interiorly of the head member 15 so that the pawl may be set for either fastening or loosening movement of the handle member 10-14-24, to correspondingly turn a nut or other fastener for tightening usually to a predetermined degree as pre-set without any possibility of overloading. With this arrangement there is no requirement to constantly or even at anytime to visually or otherwise concentrate upon a dial or signal. When the pre-set torque load has been reached, the co-operating parts 31, 36, 38, on one hand, and the parts 32, 37, 40, on the other hand, will become disengaged and their rigid connection broken with full awareness of the operator or user.

This takes out the guess and eliminates the errors incident to a variation in judgment, a variation in responsiveness and alertness, and a lack of care exercised by the user-operator where critical tightening, values are important. This type of mechanical disconnection of the parts comprising the usual rigid relationship during use up to the pre-set load limit, removes all errors due to human failures and inaccuracies, eliminates the influence of judgment, varying responsiveness to indicators by different individuals or by the same individual at different times. Precision in maximum nut turning is accomplished with uniform results over an extended period of time.

While we have illustrated and described a preferred embodiment of our invention, it must be understood that our invention is capable of considerable variation and modification without departing from the spirit of the invention. We, therefore, do not wish to be limited to the precise details of construction set forth, but desire to avail ourselves of such variations and modifications as come within the scope of the appended claims.

We claim:

1. In a torque wrench, the combination with a work engaging member, of an elongated handle member for operative connection with and turning of said work engaging member, an elongated rigid self-sustaining tension load bearing member in operative connection between said work engaging and handle members, complemental clutching and declutching elements pivotally connected to and extending between said work engaging and tension load bearing members, said clutching and declutching elements embodying interengaging camming linkage for relative movement responsive to a predetermined turning load on and work engaging and tension load bearing members and establishing rigid relationship therebetween when the turning load on said work engaging member is less than the handle member applied pre-set turning load.

2. A torque wrench defined in claim 1 wherein said camming linkage includes a pin and slot arrangement for guiding the caming linkage as the turning load arrives at the pre-set limit imposed upon said work engaging member.

3. A torque wrench defined in claim 2 wherein said clutching and declutching linkage includes a cam and cam follower that controls the movement of the pin and slot relationship depending upon the magnitude of the applied turning load relative to the pre-set load limit.

4. A torque wrench defined in claim 3 wherein said clutching and declutching linkage includes pivotal and linear displacement of the guiding and camming elements responsive to the applied turning load reaching the pre-set limit.

5. A torque wrench defined in claim 4 wherein clutch-in and declutching linkage operatively connects with an elongated tensioning rod which yields a predetermined elongation to provide a disconnecting relationship responsive to a pre-set value of turning load sustained by said tensioning rod.

6. A torque wrench defined in claim 5 wherein said turning and elongated linkage elements respond to a pre-determined load pre-set by a micrometer rod control connected therewith.

7. A torque wrench defined in claim 6 wherein said micrometer rod control varies the initial tensile urge imparted to the elongated axial rod connected to said guiding and camming elements.

8. A torque wrench defined in claim 7 wherein said camming linkage comprises a mount between said work engaging member and said elongated rod member depending upon spaced pins and a camming connector.

9. A torque wrench defined in claim 8 wherein said camming linkage mount has compound pivotal guide elements of which one connects with said elongated rod and the other with said work engaging member.

10. A torque wrench defined in claim 9 wherein said camming linkage is pivotally connected to both said elongated rod and said work engaging member so that the tensile yield of said rod permits the guided camming of said spaced pins between said mount elements.

References Cited
UNITED STATES PATENTS

| | | | |
|---|---|---|---|
| 2,300,652 | 11/1942 | Cooney | 81—52.5 |
| 2,704,472 | 3/1955 | Booth | 81—52.4 |
| 3,236,127 | 2/1966 | Knudsen et al. | 81—52.4 |

JAMES L. JONES, Jr., *Primary Examiner.*